US012608410B1

(12) United States Patent
Firestone et al.

(10) Patent No.: US 12,608,410 B1
(45) Date of Patent: Apr. 21, 2026

(54) APPARATUS FOR PREPARING RESPONSES

(71) Applicant: S2 Strategy, LLC, Corte Madera, CA (US)

(72) Inventors: Alex Firestone, New York, NY (US); Brendan Corr, San Francisco, CA (US); Brian Stone, Corte Madera, CA (US); Brian McLaughlin, Amherst, MA (US)

(73) Assignee: S2 Strategy, LLC, Corte Madera, CA (US)

( * ) Notice: Subject to any disclaimer, the term of this patent is extended or adjusted under 35 U.S.C. 154(b) by 0 days.

(21) Appl. No.: 18/971,805

(22) Filed: Dec. 6, 2024

(51) Int. Cl.
G06F 16/334 (2025.01)

(52) U.S. Cl.
CPC ...... G06F 16/3347 (2019.01); G06F 16/3344 (2019.01)

(58) Field of Classification Search
CPC .................................................. G06F 16/3347
See application file for complete search history.

(56) References Cited

U.S. PATENT DOCUMENTS

| | | | | | |
|---|---|---|---|---|---|
| 10,970,485 | B1 * | 4/2021 | Shi | .......... | G06F 40/289 |
| 11,379,670 | B1 * | 7/2022 | Liu | .......... | G06F 40/284 |
| 2004/0117189 | A1 * | 6/2004 | Bennett | ................ | G09B 5/04 |
| | | | | | 704/E15.04 |
| 2009/0119581 | A1 * | 5/2009 | Velusamy | .......... | G06F 40/274 |
| | | | | | 707/999.102 |
| 2019/0065576 | A1 * | 2/2019 | Peng | ................ | G06F 16/285 |

OTHER PUBLICATIONS

Lewis, Patrick, et al, "Retrieval-Augmented Generation for Knowlesge-Intensive NLP Tasks", 34th Conference on Neural Information Processing Systems (NeurIPS 2020), Vancouver, Canada.

* cited by examiner

*Primary Examiner* — Van H Oberly
(74) *Attorney, Agent, or Firm* — Richard A Baker, Jr.

(57) ABSTRACT

A device and method to improve the automation for answering questions in multiple computer forms is described herein. For example, an electronic questionnaire form seeking information from an institutional asset manager in a questionnaire format may require the asset manager to answer the same question for multiple potential clients. The tool described herein stores previous questions and answers, and provides the answer to a question if a near-exact question has previously been asked. If a similar question has been previously asked the tool identifies the closest answers, and then uses a large language model to combine the previous answers into a new answer. The tool may parse a questionnaire into questions and then use the cosine similarity score to determine the closeness of the question to previously answered questions.

20 Claims, 5 Drawing Sheets

APPARATUS FOR PREPARING RESPONSES

CROSS-REFERENCE TO RELATED APPLICATIONS

This is a priority patent application.

BACKGROUND

This document relates to an artificial intelligence system, in particular to an artificial intelligence system to generate answers to questions in similar forms.

When repeatedly answering forms with similar questions, there is a need to efficiently and accurately provide answers to the questions. There are many applications for this technology, from answering client inquiries to drafting sales proposals to answering due diligence questionnaires to responding to requests for proposals (RFPs). This document discloses a solution to this problem.

BRIEF SUMMARY

The disclosure also provides support for an apparatus comprising: a processor, a memory communicatively connected to the processor, the memory including a question and answer database, a large language model, a table of stems, a document, a best answer list, and a set of non-transitory machine readable instructions, where the question and answer database includes a question text, an answer text, and a question stem table, the question stem table including a database vector, where the processor is configured to execute the set of non-transitory machine readable instructions to: receive the document, loop through each question in the document, parse the question into words, lemmatize each word into the table of stems, convert the table of stems into a question vector, loop through each entry in the question and answer database, calculate a cosine similarity score between the question vector and the database vector for the entry, if the cosine similarity score is greater than an autocomplete threshold, then save the cosine similarity score and a pointer to the entry in the best answer list, if the cosine similarity score is greater than a similarity threshold, then save the cosine similarity score and the pointer to the entry in the best answer list, and continue the loop through the question and answer database, if the best answer list is empty, prompt a user for an answer, if a largest cosine similarity score in the best answer list is less than the autocomplete threshold, prompt the user to select one or more of the answer texts in the best answer list, and combine the selected answer texts with the question through the large language model to generate the answer, store the question, the table of stems, the question vector, and the answer in a new entry in the question and answer database, store the answer in the document, and continue the loop through each question in the document.

In a first example of the system, the system further comprises non-transitory machine readable instructions to distribute the document.

In a second example of the system, optionally including the first example, the set of non-transitory machine readable instructions to lemmatize each word into the table of stems further comprises non-transitory machine readable instructions to use an electronic thesaurus to combine stems with a common concept into a common stem.

In a third example of the system, optionally including one or both of the first and second examples, the memory further includes a term frequency inverse document frequency table.

In a fourth example of the system, optionally including one or more of each of the first through third examples, the term frequency inverse document frequency table is populated from data from the document.

In a fifth example of the system, optionally including one or more of each of the first through fourth examples, the term frequency inverse document frequency table is populated from the question and answer database.

In a sixth example of the system, optionally including one or more of each of the first through fifth examples, the term frequency inverse document frequency table is populated from text found on an internet.

In a seventh example of the system, optionally including one or more of each of the first through sixth examples, the term frequency inverse document frequency table includes TD-IDF stems and data on the frequency of use of the TD-IDF stems.

In an eighth example of the system, optionally including one or more of each of the first through seventh examples, the system further comprises non-transitory machine readable instructions to permit the user to edit the answer after the apparatus generates the answer.

In a ninth example of the system, optionally including one or more of each of the first through eighth examples, the system further comprises non-transitory machine readable instructions to use profile information as input to the large language model to generate the answer.

The disclosure also provides support for a method comprising: receiving a document into a computer memory, the computer memory including a question and answer database, a large language model, a table of stems, the document, a best answer list, and a set of non-transitory machine readable instructions, where the question and answer database includes a question text, an answer text, and a question stem table, the question stem table including a database vector, looping through each question in the document, parsing the question into words, lemmatizing each word into the table of stems, converting the table of stems into a question vector, looping through each entry in the question and answer database, calculating a cosine similarity score between the question vector and the database vector for the entry, if the cosine similarity score is greater than an autocomplete threshold, then saving the cosine similarity score and a pointer to the entry in the best answer list, if the cosine similarity score is greater than a similarity threshold, then saving the cosine similarity score and the pointer to the entry in the best answer list, and continuing the looping through the question and answer database, if the best answer list is empty, prompting a user for an answer, if a largest cosine similarity score in the best answer list is less than the autocomplete threshold, prompting the user to select one or more of the answer texts in the best answer list, and combining the selected answer texts with the question through the large language model to generate the answer, storing the question, the table of stems, the question vector, and the answer in a new entry in the question and answer database, storing the answer in the document, and continuing the looping through each question in the document.

In a first example of the method further comprises distributing the document.

In a second example of the method, optionally including the first example further comprises using an electronic thesaurus to combine stems with a common concept into a common stem.

In a third example of the method, optionally including one or both of the first and second examples, the computer memory further includes a term frequency inverse document frequency table.

In a fourth example of the method, optionally including one or more of each of the first through third examples, the method further comprises: populating the term frequency inverse document frequency table with data from the document.

In a fifth example of the method, optionally including one or more of each of the first through fourth examples further comprises populating the term frequency inverse document frequency table with data from the the question and answer database.

In a sixth example of the method, optionally including one or more of each of the first through fifth examples further comprises populating the term frequency inverse document frequency table with data from text found on an internet.

In a seventh example of the method, optionally including one or more of each of the first through sixth examples further comprises including TD-IDF stems and data on the frequency of use of the TD-IDF stems in the term frequency inverse document frequency table.

In an eighth example of the method, optionally including one or more of each of the first through seventh examples further comprises permitting the user to edit the answer after the answer is generated.

In a ninth example of the method, optionally including one or more of each of the first through eighth examples further comprises using profile information as input to the large language model to generate the answer.

The disclosure also provides support for an apparatus comprising: a processor comprising memory retrievably stored in the processor, the memory including a question and answer database, a large language model, a table of word stems, a questionnaire to be completed, a best answer list, an autocomplete threshold, and a set of non-transitory machine readable instructions, wherein the question and answer database includes a question text, an answer text, and a question stem table, the question stem table including a database vector, where the processor can execute the set of non-transitory machine readable instructions to: identify a question in the questionnaire, parse the question into words, lemmatize each word into the table of stems, convert the table of stems into a question vector, loop through an entry in the question and answer database, and calculate a cosine similarity score between the question vector and the database vector for the entry.

In a first example of the system, when the cosine similarity score is greater than or equal to the autocomplete threshold the answer to the question can be autocompleted by the processor from the question and answer database.

In a second example of the system, optionally including the first example, when a cosine similarity score is less than the autocomplete threshold the processor is configured to execute the set of non-transitory machine readable instructions to prompt a selection of two or more of the answer texts in the best answer and combine selected answer texts through the large language model to generate a unique answer comprising data from the database selected from a combination of more than one answer in the question and answer database.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
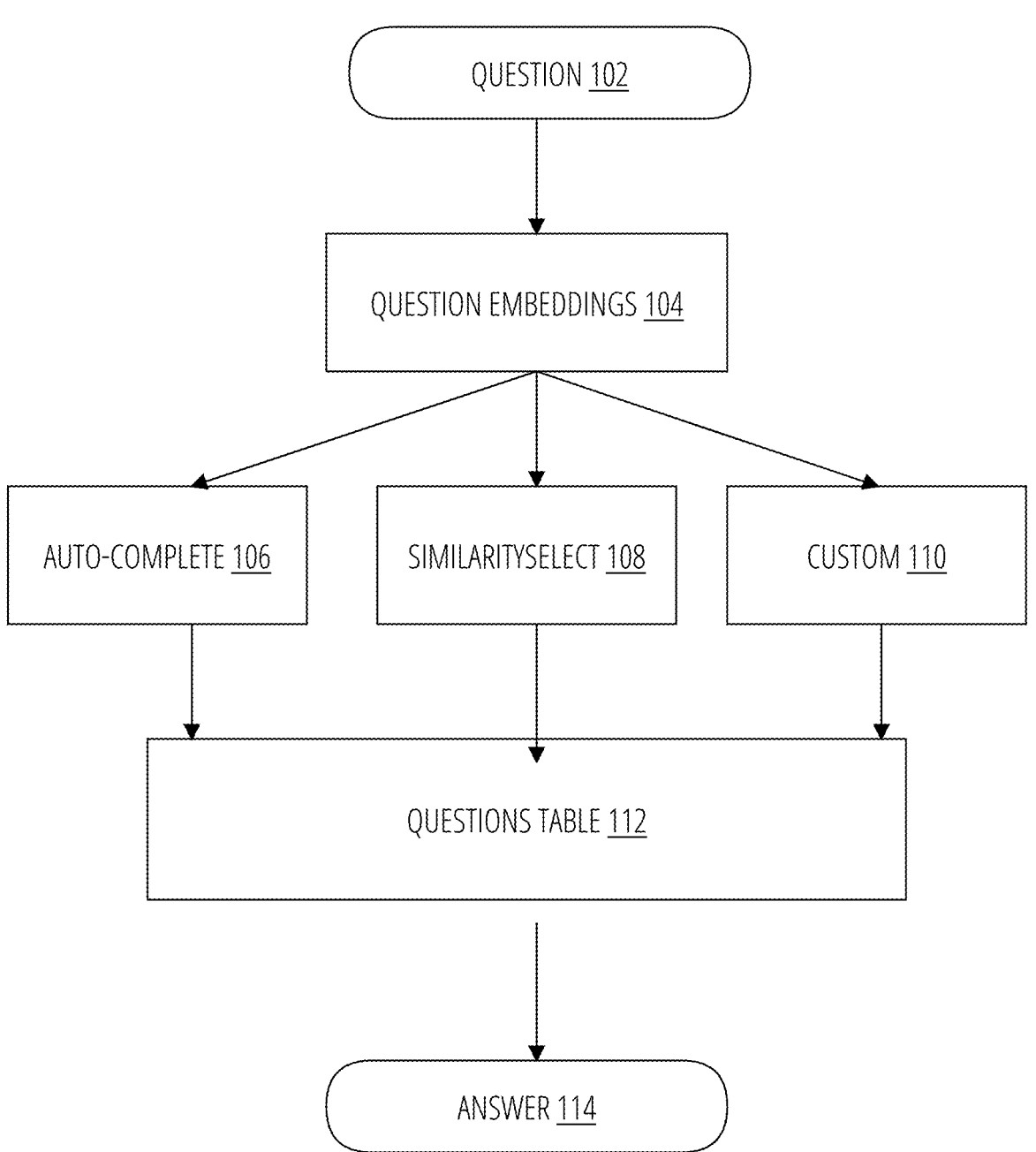
FIG. 1 illustrates a block diagram of the user's interface in one embodiment.

All illustrations of the drawings are for the purpose of describing selected versions of the present inventions and are not intended to limit the scope of the present inventions. In this document, we use the example of answering a request for proposal documents (RFPs) in the description of this technology, but the technology described herein could also be used for drafting sales proposals, answering due diligence questionnaires, or creating similar documents. The specific example of RFPs is in no way limiting to the scope of this technology.

There is a strong need to automatically provide answers to similar questions across multiple forms. Traditional solutions have involved a cut-and-paste of answers from one document into another, but these solutions do not distinguish how similar the questions are nor do cut-and-paste solutions provide assistance with the answers.

A tool to improve the automation for answering questions in multiple computer forms is described here. For example, an electronic request for proposals form seeking information from an institutional asset manager in a request for proposals format may require the asset manager to answer the same question for multiple potential clients. The tools may loop through each question in the request for proposals. The tool stores previous questions and answers in the Q&A bank 304, and provides the answer 114 to a question 102 if a near-exact question has previously been asked 106. If a similar question has been previously asked, the tool identifies the closest answers, and then uses a large language model to combine the previous answers into a new answer in the Similarity-Select 108 step. Otherwise, the user is asked to provide a Custom 110 answer. In this way, the institutional asset manager can efficiently and accurately answer the request for proposal.

The question-answering system 532 operates as a modified multi-vector, advanced indexing and retrieval system. In this question-answering system 532, the "question" serves as the parent, and the "answer" is the child that is returned. The objective is to determine how similar the questions in the question bank are to the current question 102. This helps decide whether to retrieve an answer 114 from the existing Q&A bank 304 of answered questions or create a custom response.

If the current answer 114 is identical or very similar to a question text 306 in the Q&A bank 304, the likelihood of copying the existing answer text 308 increases. Conversely, as the cosine similarity decreases, the likelihood of needing a custom answer increases. For cases that fall in the middle range, the system presents the user with several options, allowing them to decide how to proceed based on the current context.

Each question 102 is categorized into 3 buckets:

TABLE 1

| Category | Description | Cosine Distance Threshold |
|---|---|---|
| Auto Complete | The answer with the top similarity score will be autocompleted as the answer | >0.9 |
| User Selection | The top 5 answers based on a question similarity score will be presented to the user for further action | 0.75-0.9 |
| Custom | The system recommends that the user manually answer this question to avoid hallucinations or inaccurate replies. | <0.75 |

These thresholds are exemplary and can be changed or adjusted over time without deviating from the disclosure herein.

FIG. 1 illustrates the flow for each question. A question 102 is retrieved, for example, the question may be "Describe the history of your company". The question 102 is parsed and lemmatized into question embeddings 104, a vectorQ, and the vector is compared to the question stems 310 (vectorDB) in the Q&A bank 304. For each comparison, a cosine similarity score is calculated from the vectorQ and vectorDB as follows:

$$\text{cosine similarity} = \sum \text{vector } Q_i * \text{vector } DB_i / \sqrt{\sum_{i=1} \text{vector } Q_i^2} * \sqrt{\sum_{i=1} \text{vector } DB_i^2}$$

The cosine similarity score is compared to the cosine distance thresholds in TABLE 1, and a path is determined based on the results of the comparison.

If the best cosine similarity score from all question text 306 is greater than an autocomplete threshold, say 90% in one embodiment, then the question-answering system 532 follows the Autocomplete 106 path. The question text 306 from the Questions Table 112 ((or Q&A bank 304) with the highest score is selected, and the answer text 308 for that question text 306 is autopopulated as the answer 114.

If the best cosine similarity score is between the auto-complete threshold and a similarity threshold (perhaps 75% for some embodiments), then the question-answering system 532 follows a SimilaritySelect 108 path. In some embodiments, the top five question text 306 and answer text 308 from the Questions Table 112 (or Q&A bank 304) are displayed for the user to select. The user is then asked to select one or more answer text 308, and the user's selections along with the question 102 are sent to a large language model 314 to produce the answer 114.

If neither of the previous paths were followed, then the Custom 110 path is followed. The user is prompted, with an empty text box, to write a custom answer 114.

Before the answer 114 is stored, the user is provided an opportunity to edit the answer 114. Then the question text 306, the answer text 308, and the question stems 310 are stored in the Q&A bank 304.

How answers are generated

Questions 102 are categorized to help users determine the appropriate answer generation method. There could be four primary methods for generating answers 114, though only two of them involve using a large language model 314. Generally, users will choose a method based on the question's similarity score and categorization.

The Four Main Answer Generation Methods:

1. User Types a Custom 110 Answer. This method is fully human-written and is useful for questions 102 that are unique or unrelated to any other questions in the Q&A bank 304. It is often used for specific questions 102 related to the questionnaire issuer, where the firm may want to spend additional time and focus on the response.

2. Large language model 314 Generated Using "Profile" in LLM Context. This method is useful for questions 102 determined to be custom or unrelated to existing questions. The large language model 314 uses information provided by the firm using a Securities and Exchange form ADV form Part 2 and their filled-out profile to generate an answer based on a high-level understanding of the firm. This method may require further editing and relies on advanced large language model 314 models to interpret the firm's profile context when answering.

3. Large language model 314 Generated Using Previous Answers in LLM Context. This method is suited for questions 102 which fall between being fully custom and autocompletable. The large language model 314 is provided with similar past question texts 306 and answer texts 308 as part of its context. In some embodiments, the question-answering system 532 selects a number of similar answer texts 308 from the Q&A bank 304 and asks the user to select one or more answer texts 308 (or portions of answer texts 308). It then generates a response by slightly adjusting the previous answer texts 308 to fit any nuances in the current question 102 that prevent a direct reuse.

4. Use previous answer text 308 for questions 102 with very high similarity scores, a previous answer is reused. This method is ideal for cases where the existing question 102 is a near-exact match, allowing for quick autocompletion of similar questions.

Figure 2:
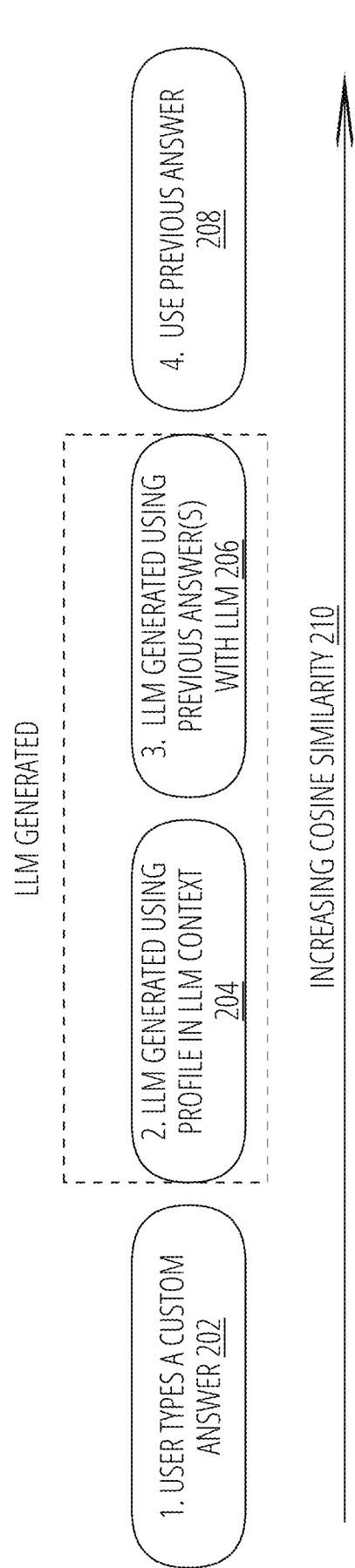
FIG. 2 shows the options for generating answers in various scenarios.

FIG. 2 shows the four options described above, with a user typing a custom answer 202 representing the lowest cosine similarity scores, and using a previous answer 208 for the highest cosine similarity scores. A large language model 314 generates the answers 114 for questions 102 with cosine similarity scores in between. With the increasing cosine similarity 210 scores, the answers are generated by the user types a custom answer 202, through LLM generated using a profile with LLM 204, then LLM generated using previous answer(s) with LLM 206, and finally use previous answer 208.

Figure 3:
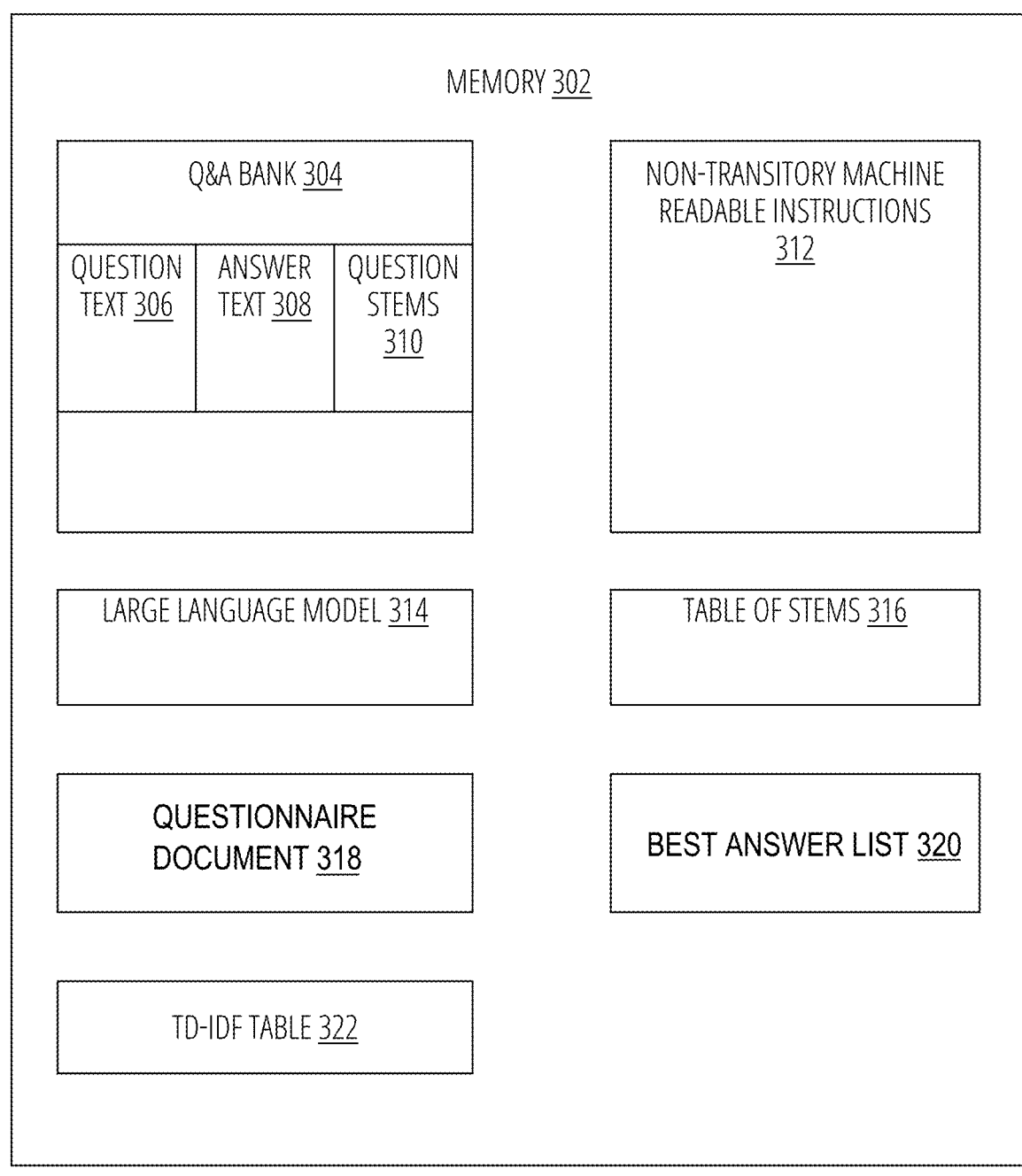
FIG. 3 illustrates one embodiment of a memory layout.

FIG. 3 shows one embodiment of the memory 302 of the question-answering system 532. This is not an exclusive list, and many other data elements will be stored in the memory 302. The 302 may include a questionnaire document 318 that includes the questions 102 that the question-answering system 532 may process. The questionnaire document 318 may be a Microsoft Word document, a PDF document, a text document, an XML document, an HTML form, a bitmapped image, or any other representation of a set of questions. In some embodiments, the questionnaire document 318 is converted into a different format to allow for easier processing. For instance, a bitmapped document may be converted using optical character recognition to text to allow for easier processing. The questionnaire document 318 may be stored in memory 302 in its original format, in a converted format, or both. The ingest RFP 404 step may also include the creation of the TD-IDF table 322 (term frequency inverse document frequency table). The TD-IDF table 322 may be created by parsing the entire RFP into words, lemmatizing the words into stems (converting the stems into a common stem by using an electronic thesaurus to match similar stems), and then storing the stems along with the frequency of use in the TD-IDF table 322. In some embodiments, the TD-IDF table 322 includes both the current questionnaire document 318 as well as all records in the Q&A bank 304. In still other embodiments, the TD-IDF table 322 includes frequency data from other documents as well.

Figure 4:
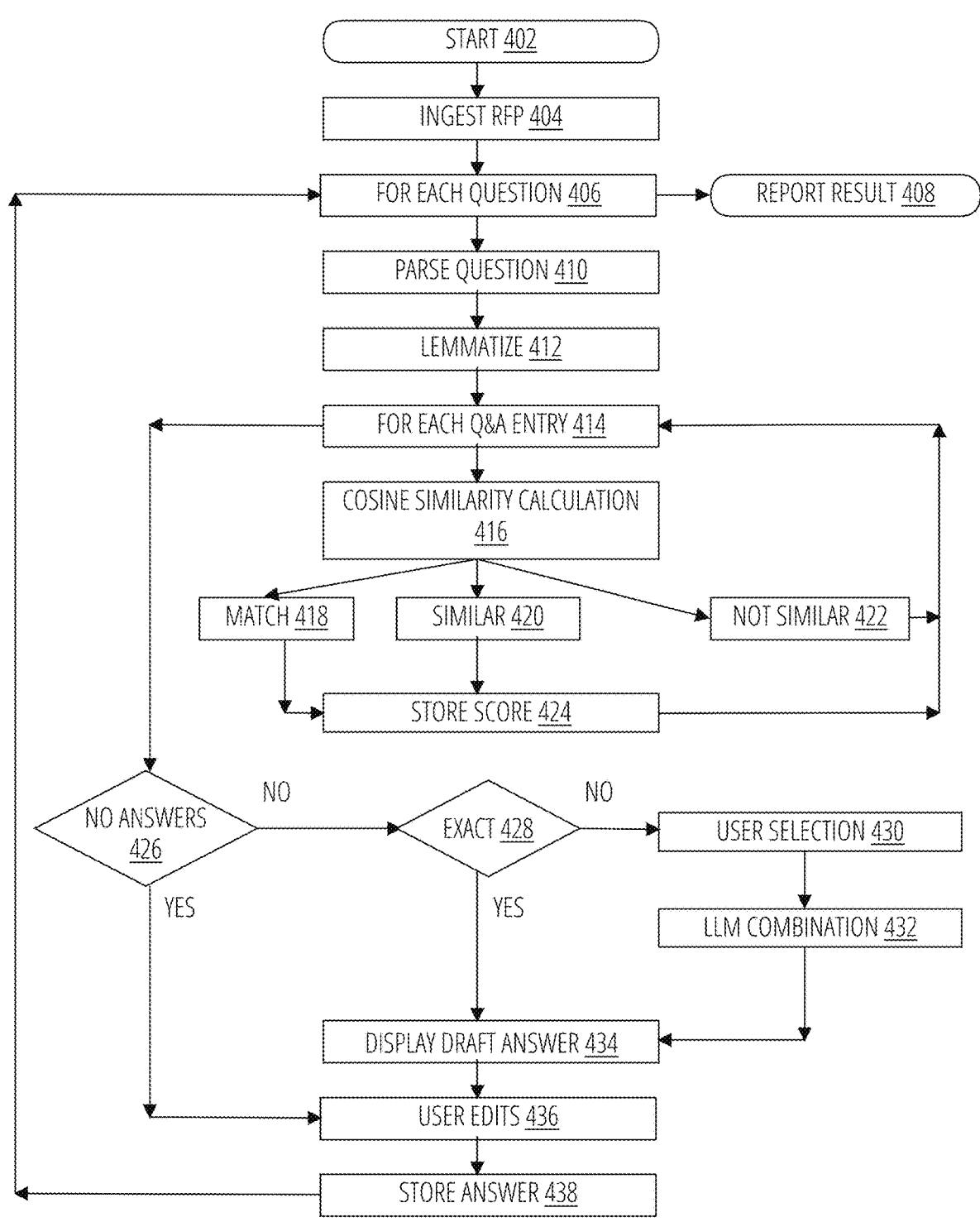
FIG. 4 illustrates a flowchart of one embodiment of the process.

The memory 302 may also include non-transitory machine readable instructions 312, instructions for the Processor 528 of the question-answering system 532 to operate the algorithms described in FIG. 1 and FIG. 4. These non-transitory machine readable instructions 312 may be processor instructions or instructions for an interpreter.

A large language model 314 may also reside in the memory 302. The large language model 314 may be a computational model designed for natural language processing tasks such as language generation. As language models, LLMs acquire these abilities by learning statistical relationships from vast amounts of text during a self-supervised and semi-supervised training process. The largest and most capable LLMs are artificial neural networks built with a decoder-only transformer-based architecture, enabling efficient processing and generation of large-scale text data. Modern models can be fine-tuned for specific tasks, or be guided by prompt engineering. These models acquire predictive power regarding syntax, semantics, and ontologies inherent in human language corpora, but they also inherit inaccuracies and biases present in the data on which they are trained. The large language model 314 may reside within the memory 302 or may be stored remotely.

The table of stems 316 may be a lemmatized version of the question 102, after the question 102 is parsed and lemmatized. The table of stems 316 may include the word stems of the question 102.

The memory 302 may also include a Q&A bank 304. In other embodiments, the Q&A bank 304 may be stored on a remote device. The Q&A bank 304 may be a database of previously answered questions 102 and answers 114. After each question 102 is answered by the question-answering system 532, the question 102, the answer 114, and the table of stems 316 may be stored in the Q&A bank 304. In addition, the Q&A bank 304 may be populated with a tool to extract questions and answers from previously completed questionnaire documents 318. This Q&A bank 304 populating tool may use FIG. 4 steps Ingest RFP 404, For each question 406, Parse Question 410, Lemmatize 412, and Store answer 438 to bring previously completed questionnaire documents into the Q&A bank 304. Another tool may allow users to edit the questions and answers stored in the Q&A bank 304.

In some embodiments, the Q&A bank 304 is a data structure comprising a plurality of records, with each record comprising a question text 306, an answer text 308, and question stems 310. The question stems 310 may be similar to the table of stems 316 and may be used to enhance the performance of the question-answering system 532 as searches are performed. In some embodiments, the Q&A bank 304 is a database of every questionnaire question and answer that an organization has compiled.

The memory 302 may also include a best answer list 320, which may be a list of pointers into the Q&A bank 304 of the closest question texts 306 to the question 102. The best answer list 320 may also include the cosine similarity scores for that particular record.

In some embodiments, the memory 302 also includes a TD-IDF table 322 of commonly used stems and their frequency of use for use in creating the vectors for the cosine similarity score. The TD-IDF table 322 may be created using the questionnaire document 318, other questionnaire documents, and the question texts 306 in the Q&A bank 304, or using a larger assembly of documents.

FIG. 4 is a flow chart of the steps to process a document with similar questions, such as sales proposals, due diligence questionnaires, or RFPs. We use the example of an RFP here, but any other document could be used in the question-answering system 532.

The process starts 402 by processing the ingest RFP 404 step. In the ingest RFP 404 step, the document is retrieved or loaded into memory 302. In some embodiments, the questionnaire document 318 is converted into a usable format. This may involve using optical character recognition software to convert the document into text or using a conversion program to extract text from a Microsoft Word or PDF document. In some situations, the document may need to be translated into a common language (French, German, English, etc). The document may need to be examined so that instructions and other boilerplate can be ignored, and the first question 102 identified.

In some documents, the questions 102 are in the form of a table to be completed. In these table implementations, each cell is considered a separate question 102, with the text of the question 102 consisting of the row heading, the column heading, and perhaps the table header or other information providing context for the table. Essentially, the table is deconstructed into a set of questions. These questions are processed through the following steps.

In some embodiments, the question-answering system 532 loops through for each question 406 in the RFP, processing the questions 102. This processing could be done in order as on the RFP, in reverse order, or in any other method of sorting. In some embodiments, the user is asked to enter or select the questions to process. In some embodiments, the question-answering system 532 can be suspended, and the processing of the questions 102 resumed in a different session.

Once the for each question 406 step is completed and all questions 102 are processed, the question-answering system 532 will save the result and report result 408 to the user, perhaps by printing the questions 102 and answers 114, or reformatting them into a word processing format, or transmitting the completed RFP to another device through the Communications subsystem 510. In some embodiments, the results could be formatted into a table, for instance, in cases where the questions were derived from a table. In some embodiments, a table output could be used for one or more questions regardless of the format of the original questionnaire.

For each question 406, the question 102 may be first parsed with the parse question 410 step. The text of the question 102 may be parsed into a table of stems 316. This could use traditional parsing techniques of searching for delimiters such as spaces, periods, tabs, commas, and other punctuation types. The strings between the delimiters are stored in the table of stems 316. In some descriptions, this is called tokenization The words in the table of stems 316 are next analyzed to convert each word into its stem by removing parts of speech that are attached to the word, such as plurality. Some descriptions call finding this process lemmatization—figuring out the most basic form or lemma of each word in the sentence. For some models, the word is categorized as a noun, verb, adverb, adjective, etc. This is the lemmatize 412 step. In some embodiments, the stem is then run through an electronic thesaurus so that synonyms are represented by the same word. The stem may then be looked up in the TF-IDF TD-IDF table 322 (term frequency inverse document frequency), and the frequency of use of the stem is placed in the table of stems 316. This table of stems 316 with the frequencies of use becomes the question 102 vector (vectorQ) for the cosine similarity calculation 416.

The Q&A bank 304 may next be searched for question text 306 that matches the question 102. In some embodiments, for each Q&A entry 414, the cosine similarity calculation 416 is performed between the question 102 vector (vectorQ) and a vector (vectorDB) for the question stems 310 for that entry. In some embodiments, the question text 306 may be converted into a vector each time. In other embodiments, the question stems 310 in the Q&A bank 304 is stored with the vector information.

The cosine similarity score is calculated 416 from the vectorQ and vectorDB as follows:

cosine similarity =

$$\sum \text{vector } Q_i * \text{vector } DB_i / \sqrt{\sum_{i=1} \text{vector } Q_i^2} * \sqrt{\sum_{i=1} \text{vector } DB_i^2}$$

The cosine similarity score will return a real number between −1 and +1. The higher the score, the more similar the question 102 is to the question text 306 for that entry in the Q&A bank 304.

The cosine similarity score is compared with thresholds to determine a course of action with this entry in the Q&A bank 304. If the cosine similarity score is above an autocomplete threshold, perhaps 0.9, then the question 102 is considered at match 418. The cosine similarity score may be then stored 424 in the best answer list 320, along with a pointer to the entry in the Q&A bank 304. This new entry in the list could be stored in order with the highest score at the top of the list or the list could be stored in the order that match was found, and sorted later. The question-answering system 532 then moves to the next entry in the Q&A bank 304.

If the cosine similarity score is below the autocomplete threshold but above a similarity threshold, perhaps 0.75, then the score is considered similar 420. The cosine similarity score may be then stored 424 in the best answer list 320, along with a pointer to the entry in the Q&A bank 304. This new entry in the list could be stored in order with the highest score at the top of the list or the list could be stored in the order that match was found, and sorted later. The question-answering system 532 then moves to the next entry in the Q&A bank 304.

If the cosine similarity score is below the similarity threshold, then the score is considered not similar 422. Nothing is saved, and the question-answering system 532 then moves to the next entry in the Q&A bank 304.

Once the for each Q&A entry 414 loop has been completed, the best answer list 320 is examined to determine what was found. If the best answer list 320 was not sorted as it was created, the list is sorted by score. If there were no answers 426, then the user is prompted to enter a custom answer in the user edits 436 step.

If the top score in the best answer list 320 was above the autocomplete threshold, then the search found at least one exact answer 428 match was found in the Q&A bank 304. The top score is used, taking the pointer in the 320 into the Q&A bank 304 to locate the answer text 308. This answer text 308 may be displayed on a display interface 502 for the user to review in the display draft answer 434 step.

If there are entries in the best answer list 320 but none are above the autocomplete threshold, then similar question texts 306 were found in the search, but no exact matches. In this scenario, the question texts 306 and the answer texts 308 may be displayed on the display interface 502 for the user to select. The user may select 430 one or more answer texts 308 (or portions of answer texts 308) to use in the answer to the question 102. If the user chooses not to select an answer, the user could edit a custom answer in the user edits 436 step. If the user selects one or more answer texts 308, then these answer texts 308 along with the question 102 are submitted to a large language model 314 in the LLM Combination 432 step. The LLM Combination 432 step combines the selected answer texts 308 with the question 102 text to generate a draft answer 114. This draft answer 114 is then displayed on the 502 in the display draft answer 434 step.

The draft answer 114 is displayed on the display interface 502, or a blank screen is displayed, for the user to edit the draft the answer 114 using a keyboard 506, mouse 508, and/or touchscreen 504 in the user edits 436 step.

Once the user edits 436 are complete, the answers are stored in the store answer 438 step. This may include storing the answer 114 in the questionnaire document 318 and creating a new entry in the Q&A bank 304. The new entry may include the question 102 in the question text 306, the answer 114 in the answer text 308, and the table of stems 316 in the question stems 310.

Then the question-answering system 532 returns to the for each question 406 step.

Figure 5:
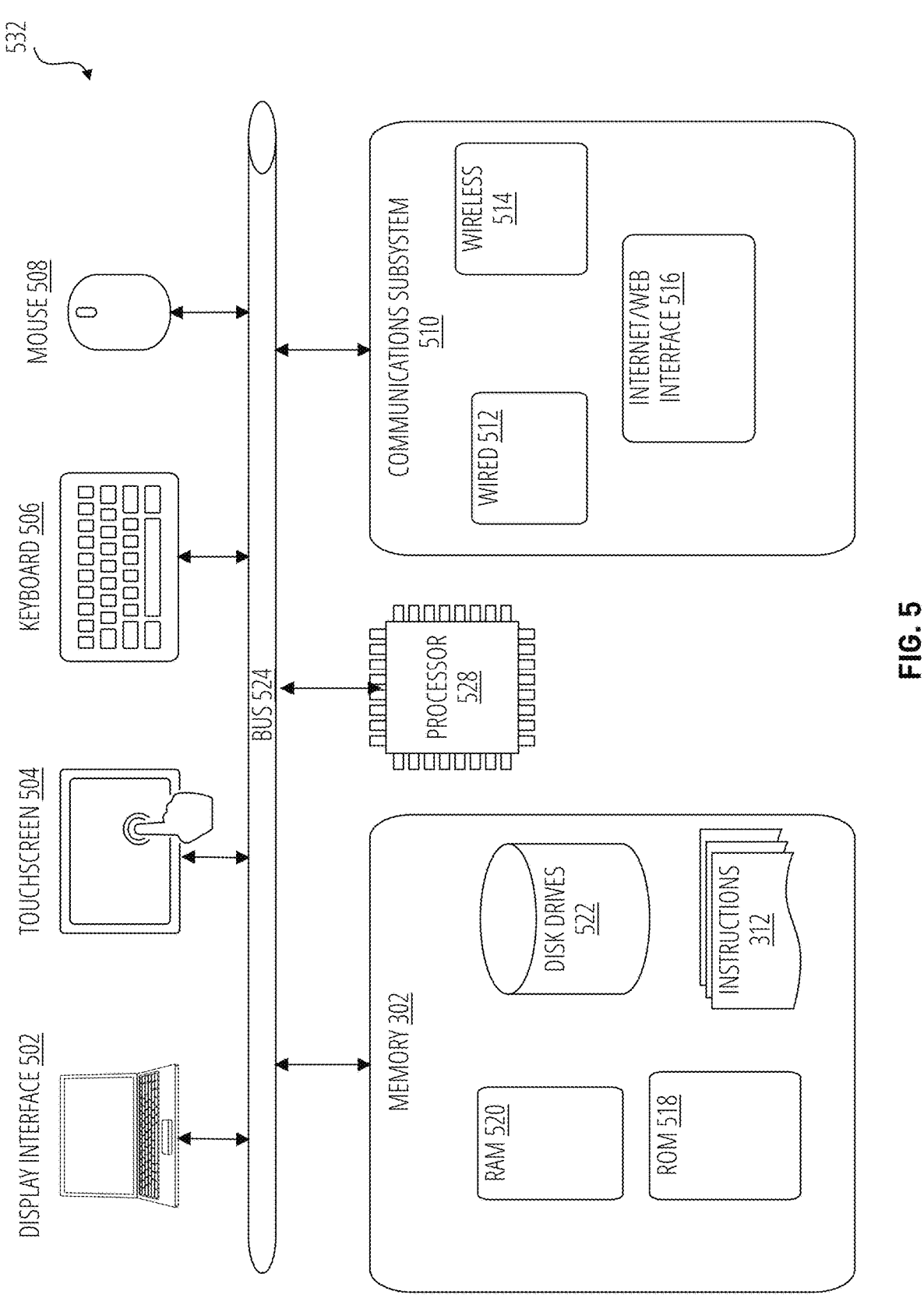
FIG. 5 illustrates an electrical diagram of a computing device in one embodiment.

FIG. 5 is a possible hardware configuration. In this configuration, a bus 524 provides the exchange of data between various components. A processor 528 may coordinate activity on the bus, retrieving non-transitory machine readable instructions 312 and data from the other devices. The processor could be a microprocessor, a system-on-a-chip, an ASIC, an optical processor, or a similar device. The processor 528 could receive instructions and data from a touchscreen 504, a keyboard 506, a mouse 508, a display interface 502, a smartwatch, a camera, a smartphone, a tablet, a telephone, a body sensor, an internet/web interface 516, or from a wired 512 or wireless 514 network.

The hardware configuration may include a communications subsystem 510 that provides a wired 512 and wireless 514 access to external devices through direct connection, local area networks, wide area networks, and the Internet. Within the communications subsystem 510 could be interfaces to the internet/web interface 516 (such as support for web browsers and web servers), In some embodiments, some or all of this functionality may be moved to the processor 528 and memory 302 or remotely to a server accessible through the wired 512 or wireless 514 network interfaces.

The memory 302 could be made up of ROM 518, RAM 520, disk drives 522, optical storage, and similar storage devices. The memory 302 could be local to the processor over the bus 524 or remote through the communications subsystem 510 or any combination thereof. The memory 302 could include a Q&A bank 304, a large language model 314, a questionnaire document 318, non-transitory machine readable instructions 312, and a table of stems 316.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies.

The foregoing devices and operations, including their implementation, will be familiar to, and understood by, those having ordinary skill in the art. This specification contains numerous dimensions, all of which could be changed without deviating from the inventions herein.

The above description of the embodiments, alternative embodiments, and specific examples, are given by way of illustration and should not be viewed as limiting. Further, many changes and modifications within the scope of the present embodiments may be made without departing from the spirit thereof, and the present inventions include such changes and modifications.

LISTING OF DRAWING ELEMENTS 102 question
104 question embeddings
106 autocomplete
108 SimilaritySelect
110 custom
112 questions table
114 answer
202 user types a custom answer
204 LLM generated using profile with LLM
206 LLM generated using previous answer(s) with LLM
208 use previous answer
210 increasing cosine similarity
302 memory
304 Q&A bank
306 question text
308 answer text
310 question stems
312 non-transitory machine readable instructions
314 large language model
316 table of stems
318 questionnaire document
320 best answer list
322 TD-IDF table
402 start
404 ingest RFP
406 for each question
408 report result
410 parse question
412 lemmatize
414 for each Q&A entry
416 cosine similarity calculation
418 match
420 similar
422 not similar
424 store score
426 no answers
428 exact answer
430 user selection
432 LLM Combination
434 display draft answer
436 user edits
438 store answer
502 display interface
504 touchscreen
506 keyboard
508 mouse
510 communications subsystem
512 wired
514 wireless
516 internet/web interface
518 ROM
520 RAM 522 disk drives
524 bus
528 processor
532 question-answering system

The invention claimed is:

1. An apparatus comprising:
a processor;
a memory communicatively connected to the processor, the memory including a question and answer database, a large language model, a table of stems, a document, a best answer list, and a set of non-transitory machine readable instructions, where the question and answer database includes a question text, an answer text, and a question stem table, the question stem table including a database vector;
where the processor is configured to execute the set of non-transitory machine readable instructions to:
receive the document;
loop through each question in the document;
parse the question into words;
lemmatize each word into the table of stems;
convert the table of stems into a question vector;
loop through each entry in the question and answer database;
calculate a cosine similarity score between the question vector and the database vector for the entry;
if the cosine similarity score is greater than an autocomplete threshold, then save the cosine similarity score and a pointer to the entry in the best answer list;
if the cosine similarity score is greater than a similarity threshold, then save the cosine similarity score and the pointer to the entry in the best answer list; and
continue the loop through the question and answer database;
if the best answer list is empty, prompt a user for an answer;
if a largest cosine similarity score in the best answer list is less than the autocomplete threshold, prompt the user to select one or more answer texts in the best answer list, and combine the selected answer texts with the question through the large language model to generate the answer;
store the question, the table of stems, the question vector, and the answer in a new entry in the question and answer database;
store the answer in the document; and
continue the loop through each question in the document.

2. The apparatus of claim 1 further comprising non-transitory machine readable instructions to distribute the document.

3. The apparatus of claim 1 where the set of non-transitory machine readable instructions to lemmatize each word into the table of stems further comprises non-transitory machine readable instructions to use an electronic thesaurus to combine stems with a common concept into a common stem.

4. The apparatus of claim 1 where the memory further includes a term frequency inverse document frequency table.

5. The apparatus of claim 4 where the term frequency inverse document frequency table is populated from data from the document.

6. The apparatus of claim 4 where the term frequency inverse document frequency table is populated from the question and answer database.

7. The apparatus of claim 4 where the term frequency inverse document frequency table is populated from text found on an internet.

8. The apparatus of claim 4 where the term frequency inverse document frequency table includes TD-IDF stems and data on a frequency of a use of the TD-IDF stems.

9. The apparatus of claim 1 further comprising non-transitory machine readable instructions to permit the user to edit the answer after the apparatus generates the answer.

10. The apparatus of claim 1 further comprising non-transitory machine readable instructions to use profile information as input to the large language model to generate the answer.

11. A method comprising:

receiving a document into a computer memory, the computer memory including a question and answer database, a large language model, a table of stems, the document, a best answer list, and a set of non-transitory machine readable instructions, where the question and answer database includes a question text, an answer text, and a question stem table, the question stem table including a database vector;

looping through each question in the document;

parsing the question into words;

lemmatizing each word into the table of stems;

converting the table of stems into a question vector;

looping through each entry in the question and answer database;

calculating a cosine similarity score between the question vector and the database vector for the entry;

if the cosine similarity score is greater than an autocomplete threshold, then saving the cosine similarity score and a pointer to the entry in the best answer list;

if the cosine similarity score is greater than a similarity threshold, then saving the cosine similarity score and the pointer to the entry in the best answer list; and continuing the looping through the question and answer database;

if the best answer list is empty, prompting a user for an answer;

if a largest cosine similarity score in the best answer list is less than the autocomplete threshold, prompting the user to select one or more answer texts in the best answer list, and combining the selected answer texts with the question through the large language model to generate the answer;

storing the question, the table of stems, the question vector, and the answer in a new entry in the question and answer database;

storing the answer in the document; and continuing the looping through each question in the document.

12. The method of claim 11 further comprises distributing the document.

13. The method of claim 11 further comprises using an electronic thesaurus to combine stems with a common concept into a common stem.

14. The method of claim 11 where the computer memory further includes a term frequency inverse document frequency table.

15. The method of claim 14 further comprising populating the term frequency inverse document frequency table with data from the document.

16. The method of claim 14 further comprises populating the term frequency inverse document frequency table with data from the the question and answer database.

17. The method of claim 14 further comprises populating the term frequency inverse document frequency table with data from text found on an internet.

18. The method of claim 14 further comprises including TD-IDF stems and data on a frequency of a use of the TD-IDF stems in the term frequency inverse document frequency table.

19. The method of claim 11 further comprises permitting the user to edit the answer after the answer is generated.

20. The method of claim 11 further comprises using profile information as input to the large language model to generate the answer.

* * * * *